Aug. 15, 1933.  L. C. PACKER  1,922,258
PORTABLE ELECTRIC TOOL
Filed May 31, 1930
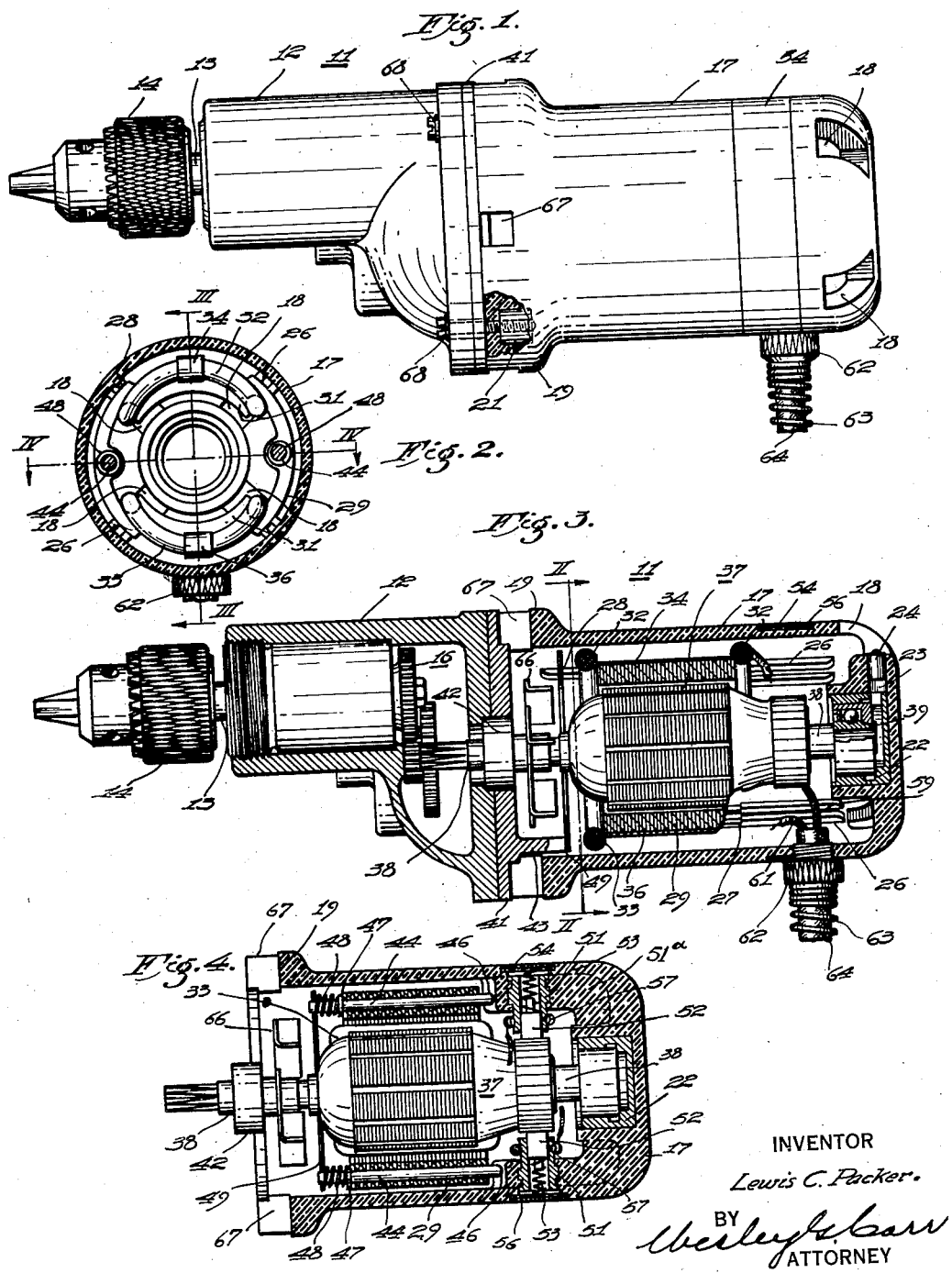
INVENTOR
Lewis C. Packer.
BY
ATTORNEY Patented Aug. 15, 1933

1,922,258

UNITED STATES PATENT OFFICE 1,922,258

PORTABLE ELECTRIC TOOL

Lewis C. Packer, Longmeadow, Mass., assignor to Westinghouse Electric & Manufacturing Company, a Corporation of Pennsylvania Application May 31, 1930. Serial No. 458,623

8 Claims. (Cl. 172—36)

My invention relates to portable tools and more particularly to housings for small portable motors.

An object of my invention is to provide a motor-driven, portable or hand tool that shall embody a minimum number of parts.

Another object of my invention is to provide a housing of molded heat and electric-insulating material for a motor-driven tool of the hand portable type.

Another object of my invention is to provide a molded one-piece motor housing that shall permit of having the motor structure being assembled therein in a simple and efficient manner.

In practicing my invention, I provide a one-piece motor housing of molded heat and electric-insulating material, which housing is open at one end and closed at the other end, having ribs therein for frictionally engaging a laminated stator structure. A bearing bracket is located at the open end of the motor housing and cooperates with means for preventing a turning movement of the stator and also with means for preventing longitudinal motion of the stator structure in one direction. Single means is provided for securing a driven device, the bearing bracket and the motor housing in proper axially alined operative positions relatively to each other.

In the single sheet of drawings,

Figure 1 is a view in side elevation, with a small portion broken away, of a motor-driven device embodying my invention;

Fig. 2 is a view in lateral section therethrough with the rotor removed, taken on the line II—II of Fig. 3;

Fig. 3 is a view in longitudinal section through a device embodying my invention, taken on the line III—III of Fig. 2, and Fig. 4 is a view in longitudinal section through a motor embodying my invention, taken on the line IV—IV of Fig. 2.

A hand drill 11 includes a housing 12 for the motor-driven device which is shown, generally only, and includes, in addition to the casing 12, a shaft 13 located therein in suitable bearings (not shown), a drill chuck 14 and a reduction gear assembly 16 illustrated as including a plurality of gears and pinions to reduce the speed of rotation of the chuck.

A motor housing 17 is made of a suitable molded heat and electric-insulating material which may include a heat hardened binder and a strengthening material such as cloth, and which may be molded hot. The housing 17 is substantially completely closed at the outer end thereof, except that it is provided with a plurality of ventilating openings 18 at this end. I have found that it is possible to mold this material in any desired color effect, thus producing a distinctive housing.

The other end of the housing is open and is provided with an annular thickened flange portion 19, as may be noted in Figs. 1, 3 and 4. A plurality of internally threaded tubular inserts 21 are located in the flange portion 19 for a purpose to be hereinafter set forth.

A bushing 22, of substantially tubular shape, is rigidly molded in place in the housing at its closed end, and an oiling opening 23 is provided to cooperate with an opening in the bushing 22 to permit of oiling a bearing supported therein. A cap member 24 is provided and, as shown, is located in one of the openings 18.

A plurality of spaced pairs of ribs 26 are provided in the inner face of the housing 17, and each rib is provided with a shoulder 27, shown in Fig. 3 of the drawing. It is to be noted also that one of the ribs 26 is extended toward the open end of the housing, as shown at 28.

A stator structure is located within the housing and includes a set of substantially annular laminations 29 whose outer periphery frictionally engages the faces of the ribs 26, one face of the set of laminations 29 fitting against the shoulders 27 on the ribs 26 to definitely locate the stator structure.

The laminations 29 are provided with salient pole pieces 31 (see Fig. 2) and field coils 32 and 33 are located on the poles 31. In order to hold the coils 32 and 33 on the poles, spring clips 34 and 36 are provided, the central portion of each of which fits against the outer periphery of the laminations 29, and the end portions of which are bent around the insulated coils 32 and 33, respectively, as shown in Fig. 3 of the drawing. This construction has a tendency to pull the coils radially outwardly, so that once located in the poles 31, they will be yieldingly urged radially outwardly and thereby held tightly in their proper operative positions.

A rotor 37 is provided and includes a shaft 38, a laminated rotor structure on the shaft, an armature winding, and a commutator, all of which may be of standard construction. A ball bearing 39 is fixedly mounted on the end of the shaft 38 at the commutator end thereof, the ball bearing 39 having its inner race fitted tightly upon the end of the shaft and having its outer race adapted to fit in the bushing 22.

A bearing bracket 41, of substantially circular shape, is provided and has mounted therein a rear ball bearing 42, whereby the rear end of the shaft 38 may be rotatably supported when the bracket 41 is located in its proper operative position at the open end of housing 17 with which it has interfitting engagement.

The bracket 41 is provided with a plurality of lugs 43 which extend at right angles to the plane of the bearing bracket 41 and has preferably three of these lugs 43.

In order to prevent turning movement of the stator assembly, including the laminations 29, I provide a plurality of relatively long pins 44 which extend through holes punched in the individual laminations, the inner ends of the pins 44 which extend through holes punched in the individual laminations, the inner ends of the pins 44 fitting into radially extending slots 46 provided in a thickened portion of the housing 17. The pins 44 are severally provided with flanges 47 which fit against the outer end of the stator laminations. Springs 48 are provided on the outer ends of pins 44, one end of the springs engaging the flanges 47, while the other ends thereof engage a disc 49 which has openings through which the outer end of pins 44 may extend. The disc 49 is pressed in one direction by the lugs 43 hereinbefore described. The disc 49 has a recess in its periphery which co-operates with the extension 28, whereby the disc 49 is prevented from having a turning movement.

Brush holders 51 are fitted into the housing 17, being properly located and held by suitable means during the molding operation of the housing. It will be observed that the brush holders 51 are mounted in suitable inwardly extending ribs or projections 51a which are formed integrally with the housing 17 during the molding operation. The brush holders are provided with central openings of substantially square shape in section, to receive carbon brushes 52 and compression springs 53. In order to provide the necessary compression, a spring metal band 54 is located peripherally of the housing 17, a groove being provided therein, so that the outer surface of band 54 shall be substantially even with the periphery of the housing. A strip 56 of electric-insulating material is located beneath the strip 54.

Suitable conductors are provided to electrically connect the field coils and the armature in series circuit relation relatively to each other, and in order to provide easily handled means for making connection to the brush holders; these latter are provided with a peripheral groove (see Fig. 4), and a connector 57 of substantially garter spring type is located thereon and may be easily and quickly slipped into place in the assembly of the device. The conductors 59 and 61 extend outwardly through a suitable bushing 62 of electric-insulating material, and a coil spring 63 may be associated with the bushing 62 to prevent undue kinking of the insulated twin conductor cord 64.

A fan 66 is mounted on the rear or outer end of shaft 388 and is arranged to draw air inwardly through the openings 18 and force it radially outwardly through ventilating openings 67 alined with the fan 66.

A plurality of short machine screws 68 extend through a flange portion of casing 12, through the bearing bracket 41, and into the housing 17 and have screw threaded engagement with the metal inserts 21.

In manufacturing the housing, it is to be noted that the bushing or bearing retainer element 22 is molded into the housing of heat and electric-insulating material, as are also the inserts 21 and the brush holders 51. It is, of course, possible to provide substantially circular openings and press the brush holders 51 into place therein. The stator structure including the laminations 29 the field coils, and the conductors associated there with are placed in position after the garter spring rings have been placed in position on the brush holders. The pins 44 are then inserted, the springs 48 placed thereon, and the baffle plate element 49 is then placed with its recess fitting over the rib portion 28. The armature is then placed in position, after which the bearing bracket 41 and the driven device, including the casing 12, are located in position and held therein by the screws 68.

The device embodying my invention thus provides a one piece molded housing of a rigid heat and electric-insulating material, having one end substantially closed and the other end open, so that all assembly work must be done from the open end only. The device shown is a hand tool, that is, it is to be held in the hand of an operator during its use, and the entire weight of the device is, therefore, small, and the radial dimensions of the housing 17 are also relatively small.

The device embodying my invention has already been manufactured, and it has been found to be relatively easy to assemble the stator and rotor structure in the housing 17, the details of construction having been selected with this object in view.

While I have shown a drilling device, I do not desire to be limited thereto as any other motor-driven device may be provided and operated when associated with the bushing and the motor housing, it being only necessary that the casing corresponding to casing 12 be adapted to be secured in its proper operative position by machine screws 68.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. In a portable motor-driven device, a unitary motor housing of molded heat and electric-insulating material having one end substantially closed and the other end open, a bearing bushing molded in said closed end, a motor assembly in the housing, a bearing bracket closing the open end of the housing, a bushing for a driven device engaging the bearing bracket, and mean extending through the housing for the driven device and the bearing bracket for clamping the motor housing, bearing bracket, and the housing for the driven device in assembled relation.

2. In a motor-driven device, a unitary motor housing of molded heat and electric-insulating material, a plurality of longitudinally-extending ribs within the housing, a stator structure in the housing frictionally engaging the ribs, and means including a pin extending through the stator structure, a disc fitting on the end of said pin and cooperating with one of the ribs to prevent peripheral movement of the stator structure.

3. In a motor-driven device, a unitary motor housing of molded heat and electric-insulating material, having one closed and one open end, a brush holder extending through the housing adjacent to the closed end, a brush and a compression spring in the brush holder and a spring band encircling the motor housing for holding the brush and spring in the brush holder.

4. In a motor driven device, a unitary motor housing of molded heat and electric-insulating material having a closed and an open end, and radially slotted internal lugs, ribs in the motor housing having a shoulder thereon, a stator assembly including stator laminations frictionally engaging the ribs and butting against the shoulders thereon, flanged pins extending axially through the stator laminations and having one end of each fitting into the radially slotted lugs, springs on the pins at their other ends abutting against the flanges on the pins, a disc interfitting with one of the ribs and the outer ends of the flanged pins and abutting the springs thereon, a bearing bracket fitting over the open end of the housing and means on the bearing bracket for engaging the disc to yieldingly resist axially movement of the pins and the stator assembly in one direction.

5. In a motor driven device, a unitary motor housing of molded heat and electric-insulating material having a closed and an open end, a bushing molded in the housing at the closed end, a stator structure frictionally held by the motor housing, a rotatable armature having a bearing structure fixedly mounted on its shaft at one end, said bearing structure fitting into the bushing, a removable bearing bracket closing the open end of the housing and cooperating with the rigidly supported bushing to rotatably mount the armature within the housing, a housing for a driven device engaging the bearing bracket and means extending through the driven device, removable bearing bracket and into the motor housing to hold the parts in proper operative positions.

6. A motor casing of a molded material comprising a unitary structure with one open and one closed end and provided with an enlarged portion around the periphery of the open end thereof, longitudinal ribs molded on the inside of said casing to provide for mounting the motor, a bearing bushing molded integrally with the closed end of said casing, and a plurality of inwardly extending projections molded integrally with said casing near the closed end thereof, said projections being provided with radial recesses to provide for mounting the brushes of the motor.

7. In a motor-driven device, a motor housing having one closed and one open end, a brushholder extending through the housing adjacent to the closed end, a brush and a compression spring in the brushholder, and a spring band encircling the motor housing, for holding the brush and spring in the brushholder, and a band of insulating material interposed between said spring band and said compression spring.

8. In a motor-driven device, a unitary motor housing of molded heat and electric-insulating material, having one closed and one open end, a brushholder extending through the housing adjacent to the closed end, a brush and a compression spring in the brushholder and a spring band encircling the motor housing for holding the brush and spring in the brushholder, said casing being provided with a groove, said spring band adapted to fit into said groove.

LEWIS C. PACKER.